United States Patent [19]

Hotta et al.

[11] Patent Number: 5,064,695

[45] Date of Patent: Nov. 12, 1991

[54] METHOD FOR FORMING COATING FILM

[75] Inventors: Kazuhiko Hotta; Koichiro Kido; Shogo Yamamoto, all of Nagoya, Japan

[73] Assignee: Mitsubishi Rayon Co., Ltd., Tokyo, Japan

[21] Appl. No.: 580,969

[22] Filed: Sep. 12, 1990

[51] Int. Cl.$^5$ .............................................. B05D 1/36
[52] U.S. Cl. .................................................. 427/407.1
[58] Field of Search .................................... 427/407.1

*Primary Examiner*—Bernard D. Pianalto
*Attorney, Agent, or Firm*—Cushman, Darby & Cushman

[57] ABSTRACT

A method for forming a coating film is here disclosed which comprises the steps of coating a member with a coating material containing a pigment for a thermosetting base coat, overcoating the coated member with a coating material for a thermosetting clear coat in a wet-on-wet coating manner, and then thermosetting the uncured coating films simultaneously;

a binder component in the coating material for the base coat comprising 50 to 90% by weight of an acrylic copolymer having a hydroxyl value of from 40 to 80 mg KOH/g and an acid value of from 0.5 to 30 mg KOH/g and a glass transition temperature of from −40° to 20° C. which is obtained by copolymerizing 10 to 40% by weight of a hydroxyl group-containing (meth)acrylic ester, 0.2 to 10% by weight of a carboxyl group-containing vinyl monomer, 30 to 89.8% by weight of a (meth)acrylic ester and 0 to 30% by weight of another vinyl monomer, and 10 to 50% by weight of a curing agent;

a binder component in the coating material for the clear coat comprising an acrylic copolymer having a hydroxyl value of from 50 to 180 mg KOH/g, an acid value of from 2 to 40 mg KOH/g and a glass transition temperature of from −40° to 20° C. which is obtained by copolymerizing 5 to 60% by weight of a fluorine-containing (meth)acrylic ester, 10 to 60% by weight of a hydroxyl group-containing (meth)acrylic ester, 0.2 to 10% by weight of a vinyl monomer containing an acidic group, 15 to 70% by weight of a (meth)acrylic ester and 5 to 50% by weight of another vinyl monomer, and a polyisocyanate compound;

a ratio X/Y of an equivalent (X) of the OH group present in the acrylic copolymer to an equivalent (Y) of the NCO group in the polyisocyanate compound being in the range of from 1/0.5 to 1/1.5.

14 Claims, No Drawings

METHOD FOR FORMING COATING FILM

BACKGROUND OF THE INVENTION (i) Field of the Invention

The present invention relates to a method for forming a coating film, and more specifically it relates to a method for forming a coating film which is desirable to coat relatively flexible plastic materials such as RIM (Reaction Injection Molding), ABS, polyurethane, polypropylene and polycarbonate for bodies and bumpers of automobiles and which is excellent in water repellency, stain resistance, bending resistance at low temperatures, and gloss maintenance and stain resistance when exposed outdoors.

(ii) Description of the Prior Art

In recent years, in reply to needs such as variegation of designs, decrease of weight and improvement of impact resistance of automobiles, plastics and elastomers are often used for bumpers, fenders, spoilers, wheels and the like of the automobiles. On these surfaces of flexible plastic materials, there are used coating materials for forming similarly flexible coating films. Particularly, in the case of the coating material which is applied onto the bumper, it is necessary that the coating film of the coating material is flexible enough to absorb deforming stress, instantaneous impact force and the like applied at a low temperature of from $-10°$ C. to $-40°$ C. and to thereby prevent the coating film from cracking.

Heretofore, as the coating materials for the members made from plastics and elastomers, there are known an acrylic urethane (Japanese Laid-open Patent Publication No. 61-93870) and a polyester urethane coating material (Japanese Laid-open Patent Publication No. 61-26614). In addition, Japanese Laid-open Patent Publication No. 58-32662 discloses an acrylic urethane coating material in which a polycaprolactone polyol is used in order to improve the flexibility of the urethane coating material. The coating films made from these urethane coating materials usually have excellent performance at low temperatures, but since they are soft, sand grains, dust, soot, metallic powder and the like tend to adhere to the surfaces thereof. Therefore, when an outdoor exposure test is carried out, the appearance of the coating films noticeably deteriorates with time inconveniently.

SUMMARY OF THE INVENTION

An object of the present invention is to provide a method for forming a coating film which can maintain characteristics such as weathering resistance, aesthetic properties and chemical resistance and which are excellent in impact resistance at low temperatures, water repellency and stain resistance.

That is, according to the present invention, there is provided a method for forming a coating film which comprises the steps of coating a member with a coating material containing a pigment for a thermosetting base coat, overcoating the coated member with a coating material for a thermosetting clear coat in a wet-on-wet coating manner, and then thermosetting both the uncured coating films simultaneously;

a binder component in the above-mentioned coating material for the base coat comprising (1) 50 to 90% by weight of an acrylic copolymer (A) having a hydroxyl value of from 40 to 80 mg KOH/g and an acid value of from 0.5 to 30 mg KOH/g and a glass transition temperature of from $-40°$ to $20°$ C. which is obtained by copolymerizing (a) 10 to 40% by weight of a hydroxyl group-containing (meth)acrylic ester, (b) 0.2 to 10% by weight of a carboxyl group-containing vinyl monomer, (c) 30 to 89.8% by weight of a (meth)acrylic ester represented by the general formula

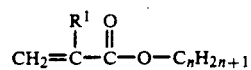

(wherein $R^1$ is a hydrogen atom or a methyl group, and n is an integer of from 1 to 6) and (d) 0 to 30% by weight of another copolymerizable vinyl monomer, and (2) 10 to 50% by weight of a curing agent; a binder component in the coating material for the clear coat comprising (3) an acrylic copolymer (B) having a hydroxyl value of from 50 to 180 mg KOH/g, an acid value of from 2 to 40 mg KOH/g and a glass transition temperature of from $-40°$ to $20°$ C. which is obtained by copolymerizing (e) 5 to 60% by weight of a (meth)acrylic ester containing a fluoroalkyl group or a perfluoroalkyl group, (f) 10 to 60% by weight of at least one hydroxyl group-containing (meth)acrylic ester represented by the general formula (II)

(wherein $R^2$ is a hydrogen atom or a methyl group, $R^3$ is an organic substituent represented by the formula (III), (IV), (V) or (VI)

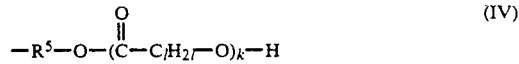

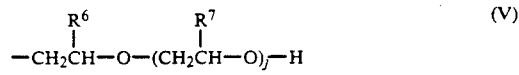

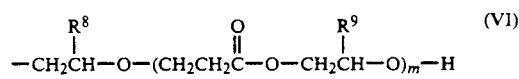

wherein each of $R^4$ and $R^5$ is a straight-chain or branched alkylene group having 1 to 8 carbon atoms, each of $R^6$, $R^7$, $R^8$ and $R^9$ is a hydrogen atom or a methyl group, l is an integer of from 2 to 5, j is an integer of from 2 to 10, k is an integer of from 1 to 7, and m is an integer of from 1 to 3), (g) 0.2 to 10% by weight of a vinyl monomer containing at least one of a carboxylic group, a sulfonic group and a phosphoric acid group, (h) 15 to 70% by weight of a (meth)acrylic ester represented by the formula (VII)

(wherein $R^{10}$ is a hydrogen atom or a methyl group, $R^{11}$ is a hydrocarbon substituent having 4 or more carbon atoms) and (i) 5 to 50% by weight of another copolymerizable vinyl monomer, and (4) a polyisocyanate compound (C);

a ratio X/Y of an equivalent (X) of the OH group present in the acrylic copolymer (B) to an equivalent (Y) of the NCO group in the polyisocyanate compound (C) being in the range of from 1/0.5 to 1/1.5.

DETAILED DESCRIPTION OF THE PREFERRED EMBODIMENTS

In preparing an acrylic copolymer (A) used in a binder of a coating material for a base coat of the present invention, it is important that the combination of monomers to be copolymerized is decided so that the glass transition temperature of the acrylic copolymer (A) may be from −40° to 20° C., preferably from −25° to 10° C. in view of the improvement at low temperatures of bending resistance of a coating film which will be obtained therefrom.

When the coating film is made from the coating material which contains the acrylic copolymer (A) having a glass transition temperature of less than −40° C., solvent resistance and weathering resistance of the coating film deteriorate, and conversely when the coating film is made from the coating material which contains the acrylic copolymer (A) having a glass transition temperature of more than 20° C., impact resistance at low temperatures and bending resistance of the coating film deteriorate unpreferably. In this connection, the glass transition temperature of the acrylic copolymer can be calculated from the following equation using a glass transition temperature (Tg) of a known homopolymer:

$$1/T_g = \Sigma m_i/T_{gi}$$

(wherein Tgi is Tg of the homopolymer of component i, and mi is a weight fraction of the component i).

Furthermore, in preparing the acrylic copolymer (A), the hydroxyl group-containing (meth)acrylic ester is used in the copolymerization so that the hydroxyl value of the acrylic copolymer (A) may be in the range of from 40 to 80 mg KOH/g, preferably from 50 to 70 mg KOH/g from the viewpoint of adhesion between the base coat and the clear coat. In the copolymerization, the amount of the hydroxyl group-containing (meth)acrylic ester is in the range of from 10 to 40% by weight, preferably from 15 to 30% by weight. When the amount of the hydroxyl group-containing (meth)acrylic ester in the acrylic copolymer (A) is less than 10% by weight, the crosslinking density of the coating film cured by crosslinking reaction between the acrylic copolymer (A) and the undermentioned amino resin is low, so that the obtained sufficient coating cannot have sufficient film performance. Conversely, when the amount of the hydroxyl group-containing (meth)acrylic ester in the acrylic copolymer (A) is more than 40% by weight, the viscosity of its solution is too high and in addition, water resistance of the cured coating film deteriorates unpreferably.

Typical examples of the hydroxyl group-containing (meth)acrylic ester include hydroxyalkyl (meth)acrylates such as 2-hydroxyethyl (meth)acrylate, 2-hydroxypropyl (meth)acrylate, 3-hydroxypropyl (meth)acrylate and 4-hydroxybutyl (meth)acrylate; a reaction product prepared by the esterification of a monoepoxy compound and (meth)acrylic acid, fumaric acid or maleic acid which is typified by "Cardura E" (glycidyl ester of a synthetic fatty acid made by Shell Petrochemical Co., Ltd.); a low-molecular polyester resin having a polymerizable unsaturated group; and Commercial available Placcel FM1, Placcel FA-2, Placcel FM2 and Placcel FM6 made by Daisel Ltd., Tone M-100 made by Union Carbide Corp. and Blemmer PP-1000 made by Nippon Oils & Fats Co., Ltd.

The carboxyl group-containing vinyl monomer in the paragraph (1) (b) constituting the acrylic copolymer (A) is a component which improves the affinity between the acrylic copolymer (A) and a pigment and which plays an important role as a catalyst for the crosslinking reaction in case the coating material for the base coat contains a curing agent. Examples of the carboxyl group-containing vinyl monomer include polymerizable monomers each having one or more carboxyl groups, for example, $\alpha,\beta$-monoethylene type unsaturated carboxylic acids such as acrylic acid, methacrylic acid, itaconic acid, maleic acid and fumaric acid; and monoalkyl esters of these acids (e.g., monomethyl ester, monoethyl ester, monobutyl ester and the like). They can be used singly or in a combination of two or more thereof so that the acid value of the acrylic copolymer (A) may be in the range of from 0.5 to 30 mg KOH/g, preferably from 3 to 20 mg KOH/g.

When the amount of copolymerized $\alpha,\beta$-monoethylene type unsaturated carboxylic acid is less than 0.2% by weight in the acrylic copolymer (A), the above-mentioned effects are insufficient. Conversely, when the amount of this kind of monomer is more than 10% by weight, the solution viscosity of the acrylic copolymer (A) is high and water resistance deteriorates unpreferably. In consequence, the amount of the carboxyl group-containing vinyl monomer is preferably in the range of from 0.5 to 5% by weight, more preferably from 1 to 3% by weight.

The (meth)acrylic ester of the general formula (I) in the paragraph (1) (c) constituting the acrylic copolymer (A) is the essential component for giving aesthetic properties, weathering resistance and flexibility to the coating film obtained by the method of the present invention. Typical examples of this kind of monomer include methyl (meth)acrylate, ethyl (meth)acrylate, n-propyl (meth)acrylate, n-butyl (meth)acrylate, isobutyl (meth)acrylate and t-butyl (meth)acrylate. The amount of the copolymerized (meth)acrylic ester monomer in the acrylic copolymer (A) is in the range of from 30 to 89.8% by weight, preferably from 50 to 80% by weight. When the acrylic copolymer (A) in which the amount of this monomer copolymerized is less than 30% by weight is used, the aesthetic properties and the weathering resistance deteriorate, and conversely when the acrylic copolymer (A) in which the amount of the monomer copolymerized is in excess of 89.8% by weight is used, the crosslink density of the cured coating film is low and solvent resistance declines unpreferably.

Other examples of the copolymerizable vinyl monomer in the paragraph (1) (d) constituting the acrylic copolymer (A) include styrene derivatives such as styrene, α-methylstyrene and vinyltoluene; polymerizable unsaturated nitriles such as acrylonitrile and methacrylonitrile; vinyl esters such as vinyl acetate and vinyl propionate; N-alkoxy-substituted amides such as N-methoxymethyl(meth)acrylamide, N-ethoxymethyl(meth)acrylamide and N-butoxymethy(meth)acrylamide; monomers containing an epoxy group such as glycidyl (meth)acrylate, (meth)allyl glycidyl ether and methaglycidyl (meth)acrylate; basic monomers such as dimethylaminoethyl(meth)acrylic acid and diethylaminoethyl(meth)acrylic acid; (meth)acrylates having alicyclic and aromatic hydrocarbon substituents such as phenyl methacrylate, benzyl methacrylate, cyclohexyl methacrylate and cyclohexyl acrylate; and (meth)acrylates having aliphatic hydrocarbon substituents such as 2-ethylhexyl (meth)acrylate, lauryl (meth)acrylate, tridecyl (meth)acrylate, cetyl methacrylate, and stearyl (meth)acrylate. They can be used singly or in a combination of two or more thereof, as occasion demands.

In the present invention, the acrylic copolymer (A) constituting the coating material for the base coat can be obtained by any known process of a solution polymerization process, a mass polymerization process and an emulsion polymerization process, but the particularly desirable acrylic copolymer is what is obtained by the solution polymerization process. The latter polymerization is achieved by copolymerizing the mixture of the above-mentioned monomers in an organic solvent in the presence of a polymerization initiator.

Examples of the usable organic solvent include usual organic solvents such as isopropanol, n-butanol, toluene and xylene, and examples of the polymerization initiator include usual polymerization initiators such as azobisisobutyronitrile, benzoyl peroxide and cumene hydroperoxide. In addition, a chain transfer agent such as 2-mercaptoethanol and n-octyl mercaptan can be used, as occasion demands.

The binder of the coating material for the base coat in the present invention contains 10 to 50% by weight, preferably 15 to 40% by weight of a curing agent in view of various characteristics. In the case of the coating material for the base coat in which the content of the curing agent is less than 10% by weight, the crosslinking density of the cured coating film is low and sufficient performance cannot be obtained. Conversely, in the case of the base coat in which it is in excess of 50% by weight, water resistance and flexibility of the cured coating film fall off unpreferably.

Preferable examples of the curing agents include amino resins and polyisocyanate compounds. The amino resin can be prepared by, for example, derivatizing aminotriazine, urea, dicyandiamide or N,N-ethylene urea to methylol, and then carrying out alkyl etherification with cyclohexanol or an alkanol having 1 to 6 carbon atoms. Particularly preferable examples of the curing agent include methyl-etherified melamine resin, butyletherified melamine resin, urea resin and benzoguanamine resin.

Examples of the polyisocyanate compound include aliphatic diisocyanates such as tetramethylene diisocyanate, hexamethylene diisocyanate and trimethylhexane diisocyanate; alicyclic diisocyanates such as isophorone diisocyanate and 4,4'-methylenebis(cyclohexyl isocyanate); aromatic diisocyanates such as xylylene diisocyanate and tolylene diisocyanate; derivatives of polyisocyanates with polyhydric alcohols such as ethylene glycol, propylene glycol, neopentyl glycol and trimethylolpropane; derivatives of low-molecular polyester resins having functional groups which react with the isocyanate group, water or the like; burets or polymers being produced from diisocyanates; and materials prepared by blocking the isocyanate group with a known blocking agent such as a low molecular weight monohydric alcohol or methyl ethyl ketone oxime. In the acrylic copolymer (B) contained in the binder of coating material for the clear coat used in the practice of the present invention, the amount of the hydroxyl group-containing (meth)acrylic ester should be decided so that a hydroxyl value may be in the range of from 50 to 180 mg KOH/g, preferably from 80 to 160 mg KOH/g so as to maintain good solvent resistance, water resistance and weathering resistance. When the coating material for the clear coat containing the acrylic copolymer (B) in which the hydroxyl value is less than 50 mg KOH/g is used, the crosslinking density due to the crosslinking reaction between this acrylic copolymer (B) and the undermentioned polyisocyanate compound (C) is low, so that sufficient performance of the coating film cannot be obtained. Conversely, when the acrylic copolymer (B) in which the hydroxyl value is more than 180 mg KOH/g is used, the crosslinking density is excessively high and aesthetic properties deteriorate. In addition, the cured coating film obtained therefrom is brittle, and impact resistance and bending resistance are poor.

Furthermore, the glass transition temperature of the acrylic copolymer (B) of the present invention is in the range of from $-40°$ to $20°$ C., preferably from $-30°$ to $10°$ C. in view of the bending resistance of the coating film at low temperatures, and thus the monomers of the acrylic copolymer (B) should be selected so that the glass transition temperature may be in the above-mentioned range. In the case of the acrylic copolymer (B) in which the glass transition temperature is less than $-40°$ C., the coating film obtained therefrom has poor solvent resistance and low weathering resistance, and conversely in the case of the acrylic copolymer (B) in which the glass transition temperature is more than $20°$ C., the coating film obtained therefrom unpreferably has poor impact resistance and bad bending resistance at low temperatures.

In the present invention, for the purpose of improving stain resistance and water repellency of the coating film, it is necessary that the (meth)acrylic ester containing a fluoroalkyl group or a perfluoroalkyl group in the preceding paragraph (3) (e) is used in the copolymerization for the preparation of the acrylic copolymer (B) used in the coating material for the clear coat. This kind of monomer is preferably a compound having a fluorine atom-substituted group, i.e., a fluoroalkyl group or a perfluoroalkyl group having 1 or more carbon atoms, preferably 3 to 22 carbon atoms on the side chain thereof. The content of the fluorine-containing monomer component in the acrylic copolymer (B) is in the range of from 5 to 60% by weight, preferably from 10 to 40% by weight. In the case of the acrylic copolymer (B) in which the content of the monomer component is less than 5% by weight, it is difficult to form the coating film having good stain resistance and water repellency, and conversely in the case of the acrylic copolymer in which the content of the above monomer component is more than 60% by weight, the coating film obtained therefrom has the drawback that adhesion to the undercoat film and repetition properties of repair deteriorate.

Typical examples of the fluorine-containing monomer include $CH_2=CHCOOCH_2CF_3$,
$CH_2=C(CH_3)COOCH_2CF_3$,
$CH_2=CHCOOCH_2CF_2CHF_2$,
$CH_2=C(CH_3)COOCH_2CF_2CHF_2$,
$CH_2=CHCOOCH(CH_3)C_2F_5$,
$CH_2=C(CH_3)COOCH(CH_3)C_2F_5$,
$CH_2=CHCOOCH(CF_3)_2$,
$CH_2=C(CH_3)COOCH(CF_3)_2$,
$CH_2=CHCOOCH_2CF_2CHFCF_3$,
$CH_2=C(CH_3)COOCH_2CF_2CHFCF_3$,
$CH_2=CHCOOCH(CH_3)C_3F_7$, $CH_2=C(CH_3)COOCH(CH_3)C_3F_7$,
$CH_2=CHCOOCH_2(CF_2)_4H$,
$CH_2=C(CH_3)COOCH_2(CF_2)_4H$,
$CH_2=CHCOOCH_2C_7F_{15}$, $CH_2CHCOOCH_2C_8F_{17}$,
$CH_2=C(CH_3)COOCH_2C_8F_{17}$,
$CH_2=CHCOOCH_2C_{10}F_{21}$,
$CH_2=C(CH_3)COOCH_2C_{10}F_{21}$,
$CH_2=CHCOO(CH_2)_2C_8F_{17}$,
$CH_2=C(CH_3)COO(CH_2)_2C_8F_{17}$,
$CH_2=CHCOOCH_2C_2F_5$, $CH_2=C(CH_3)COOC_2F_5$,
$CH_2=CHCOO(CH_2)_2(CF_2)_4F$,
$CH_2=C(CH_3)COO(CH_2)_2(CF_2)_4F$,
$CH_2=CHCOO(CH_2)_2(CF_2)_6F$,
$CH_2=C(CH_3)COO(CH_2)_2(CF_2)_6F$, various acrylic esters and methacrylic esters each having a fluoroalkyl group or a perfluoroalkyl group. This kind of monomer can be prepared by reacting acrylic acid, methacrylic acid or an acid chloride thereof with a fluoroalcohol having a straight side chain or a branched side chain, or by reacting a fluorocarboxylic acid having a straight side chain or a branched side chain or an acid chloride thereof with a hydroxyl group-containing vinyl monomer such as 2-hydroxyethyl (meth)acrylate or 2-hydroxypropyl (meth)acrylate. Theses fluorine-containing monomers can be used singly or in the form of a mixture of two or more thereof.

The amount of the hydroxyl group-containing (meth)acrylic ester in the preceding paragraph (3) (f) constituting the acrylic copolymer (B) is in the range of from 10 to 60% by weight, preferably from 20 to 40% by weight. In the case of the acrylic copolymer (B) in which the amount of this kind of monomer is less than 10% by weight, the crosslinking density of the coating film cured by the crosslinking reaction between this acrylic copolymer (B) and the polyisocyanate compound (C) is too low to obtain the coating film having sufficient performance. In addition, in the case of the acrylic copolymer (B) in which the amount of the above mentioned monomer is more than 60% by weight, the solution viscosity of the copolymer is too high, and the cured coating film obtained therefrom is brittle and impact resistance at low temperatures and bending resistance deteriorate unpreferably. Examples of the hydroxyl group-containing vinyl monomer in the preceding paragraph (3) (f) include hydroxyalkyl (meth)acrylates such as 2-hydroxyethyl (meth)acrylate, 2-hydroxypropyl (meth)acrylate, 3-hydroxypropyl (meth)acrylate and 4-hydroxybutyl (meth)acrylate; reaction product of 2-hydroxyethyl (meth)acrylate with ethylene oxide and a reaction product of 2-hydroxyethyl (meth)acrylate with propylene oxide; reaction product of 2-hydroxyethyl (meth)acrylate with organic lactones such as a reaction product of 2-hydroxyethyl (meth)acrylate with γ-butyrolactone and a reaction product of 2-hydroxyethyl (meth)acrylate with ε-caprolactone; and dimers and trimers of 2-hydroxyethyl (meth)acrylate and 2-hydroxypropyl (meth)acrylate.

Typical examples of the hydroxyl group-containing (meth)acrylic ester represented by the general formula (II) include commercial available Placcel FM1, Placcel FM2, Placcel FM4, Placcel FA2 and Placcel FM6 made by Daisel Ltd.; Blemmer PE-90, Blemmer PE-350 and Blemmer PP-1000 made by Nippon Oils & Fats Co., Ltd.; acrylic oligomers such as HE-20 and HP-20 made by Nippon Shokubai Kagaku Kogyo Co., Ltd.; and Tone M-100 made by Union Carbide Corp.

The vinyl monomers each containing a carboxylic group, a sulfonic group or a phosphoric acid group in the preceding paragraph (3) (g) which are components of the acrylic copolymer (B) can be used singly or in combination in the copolymerization so that the acid value of the acrylic copolymer (B) may be in the range of from 2 to 40 mg KOH/g, preferably from 5 to 20 mg KOH/g.

This kind of monomer has at least one carboxylic group, sulfonic group or phosphoric acid group in the molecule thereof, and examples of the monomer include acrylic acid, methacrylic acid, itaconic acid, citraconic acid, maleic acid, fumaric acid, crotonic acid, monobutyl itaconate, monomethyl itaconate, monooctyl itaconate, monobutyl maleate, monomethyl maleate, monooctyl maleate, 2-sulfoethyl methacrylate, 2-acrylamide-2-methylpropanesulfonic acid, vinylbenzenesulfonic acid, and commercially available Kayamer PM-21 made by Nippon Kayaku Co., Ltd. and Lightester PM made by Kyoei Oils & Fats Co., Ltd. In the copolymerization of the acrylic copolymer (B), the above-mentioned vinyl monomer having the acidic substituent is used in an amount of from 0.2 to 10% by weight, preferably from 0.5 to 5% by weight.

In the case of the acrylic copolymer (B) in which the amount of this kind of monomer is less than 0.2% by weight, a reaction rate of the reaction between the acrylic copolymer (B) and a curing agent is low and the coating film having sufficient performance cannot be obtained. Conversely, in the case of the acrylic copolymer in which the amount of the above monomer is more than 10% by weight, the coating film obtained therefrom has poor water resistance unpreferably.

The (meth)acrylate represented by the general formula (VII) in the preceding paragraph (3) (h) constituting the acrylic copolymer (B) is the essential component for improving solvent resistance, flexibility, aesthetic properties and weathering resistance of the coating film obtained therefrom. In the copolymerization of the acrylic copolymer (B), the (meth)acrylate monomer is used in an amount of from 15 to 70% by weight, preferably from 30 to 60% by weight.

In the case of the acrylic copolymer (B) in which the amount of the monomer is less than 15% by weight, the coating film having good aesthetic properties and weathering resistance cannot be formed. Conversely, in the case of the acrylic copolymer in which the amount of the above monomer is more than 70% by weight, the hardness and solvent resistance of the obtained coating film are unpreferably poor. Typical examples of the monomer include n-butyl (meth)acrylate, iso-butyl (meth)acrylate, tert-butyl (meth)acrylate, sec-butyl (meth)acrylate, cyclohexyl methacrylate, 2-ethylhexyl (meth)acrylate, lauryl (meth)acrylate, tridecyl (meth)acrylate, cetyl (meth)acrylate, stearyl (meth)acrylate, benzyl (meth)acrylate, phenyl (meth)acrylate, and commercially available FA-511A and FA-513M made by Hitachi Chemical Co., Ltd.

The other copolymerizable vinyl monomer in the preceding paragraph (3) (i) constituting the acrylic copolymer (B) can be used in such a amount as not to impair one feature of the present invention, i.e., the aesthetic properties in the copolymerization of the acrylic copolymer (B), as occasion demands. Typical examples of this kind of monomer include styrene derivatives such as styrene, α-methylstyrene and vinyltoluene; polymerizable unsaturated nitriles such as acrylonitrile and methacrylonitrile; vinyl esters such as vinyl acetate and vinyl propionate; N-alkoxy-substituted amides such as N-methoxymethyl(meth)acrylamide, N- ethoxymethyl(meth)acrylamide and N-butoxymethyl(meth)acrylamide; monomers containing an epoxy group such as glycidyl (meth)acrylate, (meth)allyl glycidyl ether and methaglycidyl (meth)acrylate; basic monomers such as dimethylaminoethyl(meth)acrylic acid and diethylaminoethyl(meth)acrylic acid; methyl (meth)acrylate, ethyl (meth)acrylate and propyl (meth)acrylate.

The polymerization of the acrylic copolymer (B) used in the coating material for the clear coat is achieved by any of polymerization techniques suitable for the acrylic copolymer (A) contained in the coating material for the base coat, but above all, a solution polymerization is preferable.

The binder of the coating material for the clear coat which is used in the practice of the present invention contains the polyisocyanate compound (C) as a curing agent so as to obtain the above-mentioned quality performance of the coating material for automobiles which is the main application.

The content of the polyisocyanate compound (C) as the curing agent in the binder of coating material for the clear coat is such that a ratio X/Y of the equivalent (X) of the OH group present in the acrylic copolymer (B) to the equivalent (Y) of the NCO group in the polyisocyanate compound (C) is in the range of from 1/0.5 to 1/1.5, preferably from 1/0.8 to 1/1.2. In the coating film obtained from the coating material for the clear coat in which the ratio X/Y is more than 1/0.5, solvent resistance and water resistance are poor, and conversely in the coating film obtained from the coating material for the clear coat in which the ratio X/Y is less than 1.5, brittleness occurs, and impact resistance at low temperatures and bending resistance deteriorate unpreferably.

The polyisocyanate compound (C) which is used by way of the curing agent is the same as the above-mentioned curing agent suitable for the coating material for the base coat, and typical examples of the polyisocyanate compound (C) include Sumidur N-75 and Sumidur N-3200 made by Sumitomo Bayer Urethane Co., Ltd., Coronate EH and Coronate 2513 made by Nippon Polyurethane Co., Ltd., IPDI-T-1890 made by Daisel Fuls Co., Ltd., and Takenate B-820-NSU made by Takeda Chemical Industries, Ltd.

In the coating material for the base coat used in the present invention, there can be employed known auxiliary additives which can usually be used in the preparation of the coating material as occasion demands. Examples of such auxiliary additives include a gloss agent such as aluminum paste, mica or scaly iron oxide; a pigment such as titanium oxide, carbon black, quinacridone or Cyanine Blue; a resin other than acrylic resin such as polyester resin, epoxy resin or cellulose resin (e.g., cellulose acetate butylate); a surface levelling agent, an ultraviolet absorber, an antioxidant and a pigment precipitation inhibitor. They can be used in a usual blending manner.

Furthermore, in order to give flexibility to the coating material for the clear coat in preparing the coating material as occasion demands, a reactive diluent can be used which are, for example, commercially available Placcel 208, Placcel 308 and Placcel 220 made by Daisel Ltd., and Tone D-190 and Tone D-225 made by Union Carbide Corp. which are polycaprolactone polyol The method for preparing the coating film of the present invention is connected with a technique of obtaining a coating film having excellent properties as the coating film, i.e., excellent gloss, water repellency, bending resistance and weathering resistance, and in particular, this kind of coating film is beneficially applicable to flexible plastics for automobiles.

Now, the present invention will be described in reference to examples.

Preparation Example of Acrylic Copolymer Contained in Coating Material for Base Coat In a vessel equipped with a stirrer, a temperature controller and a condenser were placed 40 parts by weight of toluene and 10 parts by weight of n-butyl acetate. The contents in the vessel were then heated with stirring up to a temperature of 90° C. Next, a monomer composition (1) shown in Table 1 was added thereto dropwise over 4 hours, and a solution comprising 0.6 parts by weight of benzoyl peroxide and 20 parts by weight of toluene was added thereto over 30 minutes in order to carry out polymerization. The resulting reaction solution was further heated with stirring at 90° C. for 2 hours so as to heighten conversion to a resin, and 30 parts by weight of toluene was then added thereto in order to bring the reaction to an end. The thus obtained solution of an acrylic copolymer (A) (nonvolatile component = 50% by weight) will be called an acrylic resin varnish (D). The acrylic copolymer (A) contained in this acrylic resin varnish (D) met the requirements of the above-mentioned acrylic copolymer (A) in the present invention. The weight-average molecular weight of the acrylic copolymer (A) was 80,000.

Next, reaction was carried out by the same procedure as in the aforesaid step except that the monomer composition (1) was replaced with a monomer composition (2) shown in Table 1, thereby obtaining a solution of an acrylic copolymer (A) (nonvolatile component = 50% by weight). The latter will be called an acrylic resin varnish (E). The weight-average molecular weight of the acrylic copolymer (A) contained in this varnish was 90,000.

TABLE 1

| Component | Monomer Composition (1) (pts. wt.) | Monomer Composition (2) (pts. wt.) |
| --- | --- | --- |
| Glass Transition Temp. (°C.) of Acrylic Copolymer (A) | −20 | −20 |
| Methacrylic Acid | 1 | — |
| Itaconic Acid | — | 2 |
| Methyl Methacrylate | 20 | 16 |
| Ethyl Acrylate | 10 | — |
| n-Butyl Acrylate | 59 | 70 |
| 2-Hydroxyethyl Acrylate | 10 | — |
| 2-Hydroxyethyl Methacrylate | — | 12 |
| Benzoyl Peroxide | 0.8 | 0.7 |
| Total | 100.8 | 100.7 |

PREPARATION EXAMPLE OF COATING MATERIAL FOR BASE COAT

Raw materials were put in a stainless steel vessel in each ratio shown in Table 2, and they were then stirred sufficiently. Afterward, the viscosity of the resulting mixture was adjusted by the used of a mixed solvent for dilution in order to prepare coating materials B-1 to B-3 for a base coat.

TABLE 2

| | Components of Coating Material (pts. wt.) | | |
|---|---|---|---|
| | B-1 | B-2 | B-3 |
| Acrylic Resin Varnish (D) | 100 | | 100 |
| Acrylic Resin Varnish (E) | | 100 | |
| Uban 22R*[1] | | | 25 |
| Coronate EH*[2] | 9 | 8 | |
| Alpaste 1700NL*[3] | 10 | 12 | 12 |
| Viscosity (sec) (by use of Ford Cup No. 4 at 20° C.)*[4] | 13 | 13 | 13 |

Notes:
*[1] Butylated melamine resin made by Mitsui Toastu Chemicals, Inc. (nonvolatile component = 50% by weight).
*[2] Polyisocyanate compound made by Nippon Polyurethane Co., Ltd.
*[3] Aluminum paste made by Toyo Aluminum Co., Ltd.
*[4] Each coating material was diluted with a mixed solvent of toluene:ethyl acetate:-Solvesso 150 (aromatic petroleum fraction made by Esso Inc.) = 40:40:20

PREPARATION EXAMPLE OF ACRYLIC COPOLYMER CONTAINED IN COATING MATERIAL FOR CLEAR COAT

In a vessel equipped with a stirrer, a temperature controller and a condenser were first placed 53.3 parts by weight of Sorbesso No. 100 (aromatic petroleum derivative made by Esso Inc.), and the contents in the vessel were heated with stirring up to a temperature of 120° C. Next, a solution was added thereto dropwise over 3 hours which had been prepared by adding 2 parts by weight of azobisisobutyronitrile and 2 parts by weight of t-butylperoxyisopropyl carbonate to 100 parts by weight of each monomer mixture shown in Table 3. Afterward, azobisisobutyronitrile was added thereto every 0.1 part by weight at an interval of 30 minutes four times. Furthermore, the solution was heated with stirring at 120° C. for 2 hours so as to heighten conversion to a resin, and 13.3 parts by weight of n-butyl acetate was added thereto in order to bring the reaction to an end. Table 3 shows viscosities of six kinds of solutions containing the acrylic copolymers (B), contents of nonvolatile components and acid values of the respective acrylic copolymers (B).

PREPARATION EXAMPLE OF COATING MATERIAL FOR CLEAR COAT

Six kinds of coating materials P-1 to P-6 for a clear coat were prepared by using the above-mentioned six solutions of the acrylic copolymers (B) in blending ratios shown in Table 3.

Of these coating materials for the clear coat, the coating materials in which their acrylic copolymers meet the requirements of the acrylic copolymer (B) in the present invention are from P-1 to P-4.

TABLE 3

| | Coating Material for Clear Coat | | | | | |
|---|---|---|---|---|---|---|
| | P-1 | P-2 | P-3 | P-4 | P-5 | P-6 |
| Monomer Components (pts. wt.) | | | | | | |
| Component (e) | | | | | | |
| 2,2,3,3-Tetrafluoropropyl Methacrylate | | | 30 | | | 30 |
| 1H,1H,2H,2H-Nonafluorohexyl Methacrylate | | 15 | | 20 | | |
| 1H,1H,2H,2H-Heptadecafluorodecyl Methacrylate | 10 | | | | | |
| Component (f) | | | | | | |
| Blenmer PP 1000*[1] | | 25 | | | | |
| Tone M-100*[2] | | | 20 | | 30 | |
| Praksel FM6*[3] | 30 | | | | | |
| 4-Hydroxybutyl Acrylate | | 12 | | 19.3 | | |
| 2-Hydroxyethyl Acrylate | 12 | 15 | | | 6.5 | 24.4 |
| Component (g) | | | | | | |
| Methacrylic Acid | | 1 | 0.8 | 1 | 1 | 1.5 |
| Itaconic Acid | 1 | | | | | |
| Component (h) | | | | | | |
| n-Butyl Methacrylate | 9 | | 5 | | 15 | 10 |
| 2-Ethylhexyl Methacrylate | | 6 | | | 6.5 | |
| 2-Ethylhexyl Acrylate | 10 | | | | 30 | |
| Lauryl Methacrylate | 18 | 15 | 23.5 | 13.7 | | |
| n-Butyl Acrylate | | 10 | | | | 14.1 |
| Component (i) | | | | | | |
| Styrene | 10 | 16 | 5.7 | 11 | 11 | 15 |
| Ethyl Acrylate | | | | 35 | | |
| Methyl Methacrylate | | | | | | 5 |
| Solvent (pts. wt.) | | | | | | |
| n-Butyl Acetate | 13.3 | 13.3 | 13.3 | 13.3 | 13.3 | 13.3 |
| Xylene | 53.3 | 53.3 | 53.3 | 53.3 | 53.3 | 53.3 |
| Characteristic Value of Acrylic Copolymer (B) | | | | | | |
| Glass Transition Temperature (°C.)*[4] | −30 | −20 | −10 | −15 | −23 | 26 |
| Hydroxyl Value (mg KOH/g) | 79 | 85 | 105 | 75 | 80 | 118 |
| Acid Value (mg KOH/g) | 9 | 7 | 5 | 7 | 7 | 10 |
| Characteristic Value of Acrylic Copolymer (B) Solution | | | | | | |
| Viscosity*[5] | S | T | V | W | T | Y |
| Nonvolatile Component (% by weight) | 60 | 60 | 60 | 60 | 60 | 60 |
| Components of Coating Material (pts. wt.) | | | | | | |
| Solution of Acrylic Copolymer (B) | 100 | 100 | 100 | 100 | 100 | 100 |
| Coronate EH*[7] | 17 | 18 | 20 | 16 | 18 | 20 |
| Modaflow*[6] | 0.08 | 0.08 | 0.08 | 0.08 | 0.08 | 0.08 |
| Thinner Composition | | | | | | |
| Xylene/Solvesso 100 | 70/30 | 70/30 | 70/30 | 70/30 | 70/30 | 70/30 |

TABLE 3-continued

|  | Coating Material for Clear Coat | | | | | |
|---|---|---|---|---|---|---|
|  | P-1 | P-2 | P-3 | P-4 | P-5 | P-6 |
| Viscosity of Coating Material (sec)*8) | 20 | 20 | 20 | 20 | 20 | 20 |

Notes:
*1)Reaction products of 2-hydroxypropyl methacrylate with propropylene oxide made by Nippon Oils & Fats Co., Ltd.
*2)Reaction products of 2-hydroxyethyl acrylate with ε-caprolactone made by Union Carbide Corp.
*3)Reaction products of 2-hydroxyethyl methacrylate with ε-caprolactone made by Daisel Ltd.
*4)The glass transition temperature (Tg) of the acrylic copolymer was calculated by the following FOX formula: $1/T_g = \Sigma\, {}^{mi}/{T_{gi}}$ (wherein Tgi is Tg of the homopolymer of component i, and mi is a weight fraction of the component i).
*5)Measurement was made at 25° C. by the use of a Gardner-Holdt bubble viscometer.
*6)An acrylic surface levelling agent made by Monsanto Chemical Co.
*7)A polyisocyanate compound made by Nippon Polyurethane Co., Ltd.
*8)Measurement was made at 20° C. by the use of Ford Cup No. 4.

EXAMPLES 1 to 5 AND COMPARATIVE tance at low temperatures and the like are poorer than in the examples.

TABLE 4

|  | Example 1 | Example 2 | Example 3 | Example 4 | Example 5 | Comp. Example 1 | Comp. Example 2 |
|---|---|---|---|---|---|---|---|
| Curing Conditions (°C. × 30 minutes) | 100 | 100 | 100 | 100 | 110 | 100 | 100 |
| Constitution of Coating Film |  |  |  |  |  |  |  |
| Coating Material for Base Coat | B-1 | B-1 | B-2 | B-2 | B-3 | B-1 | B-1 |
| Coating Material for Clear Coat | P-1 | P-2 | P-3 | P-4 | P-3 | P-5 | P-6 |
| Performance of Coating Film |  |  |  |  |  |  |  |
| Gloss*1) | 98 | 96 | 97 | 96 | 96 | 95 | 96 |
| Water Repellency*2) | 94 | 90 | 88 | 92 | 88 | 78 | 88 |
| Bending Resistance*3) at Low Temp. | ⊚ | ⊚ | ⊚ | ⊚ | ⊚ | ⊚ | X |
| Chemical Resistance*4) | ⊚ | ⊚ | ⊚ | ⊚ | ⊚ | ⊚ | ⊚ |
| Gasoline Resistance*5) | ⊚ | ⊚ | ⊚ | ⊚ | ⊚ | ⊚ | ⊚ |
| Warm Water Resistance*6) | ⊚ | ⊚ | ⊚ | ⊚ | ⊚ | ⊚ | ⊚ |
| Weathering Resistance*7) | ⊚ | ⊚ | ⊚ | ⊚ | ⊚ | ○ | ⊚ |
| Stain Resistance*8) | ⊚ | ⊚ | ⊚ | ⊚ | ⊚ | Δ | ⊚ |

The symbols in this table have the following meanings, and each evaluation was made on the day subsequent to the formation of the coating film.
⊚: Very excellent
○: Excellent
Δ: Slightly poor
X: Poor
Notes:
*1)Measurement was made at 60° C. by the use of a digital varied-angle gloss meter UGV-4D made by Suga Tester Co., Ltd.
*2)Measurement was made by putting a drop of pure water on the surface of the coating film, and then determining a contact angle by a contact angle meter made by Kyowa Kagaku Co., Ltd. (the unit was degree).
*3)Evaluation was made by observing the surface state of the coating film when the latter was bent at 180° at a temperature of −20° C. via a round rod having a diameter of 50 mm.
*4)Evaluation was made by immersing each test piece in a 5% aqueous sulfuric acid solution at room temperature for one day, and then observing its appearance visually.
*5)Evaluation was made by immersing each test piece in Nisseki regular gasoline at room temperature for one day, and then observing its appearance visually.
*6)Evaluation was made immersing each test piece in warm water at 40° C. for the days, and then observing its appearance visually.
*7)The weathering resistance test was carried out for 1000 hours by the use of a QUV acceleration tester made by Q Panel Co., Ltd.
*8)Evaluation was made on the basis of erasing properties by marking the surface of the coating film with oily black ink, allowing it to stand at room temperature for 24 hours, and then wiping out the ink mark with a gauze containing n-butanol.

EXAMPLES 1 and 2

Each piece was coated with each diluted coating material for a base coat shown in Table 2 so that the thickness of a dried film might be 20 μm, and the coated piece was allowed to stand for 5 minutes. Afterward, the piece was further coated with each diluted coating material for a clear coat shown in Table 3 in a wet-on-wet manner so that the thickness of a dried film might be 30 μm. The overcoated film which was not dried yet was allowed to sand at room temperature for 10 minutes and then dried under curing conditions shown in Table 4 in order to form each coating film.

As is apparent from the results in Table 4, the coating films obtained in the examples are excellent in gloss, water repellency, bending resistance at low temperatures, stain resistance and weathering resistance. On the contrary, in the comparative examples which are out of the scope of the accompanying claims of the present case, water repellency, stain resistance, bending resistance at low temperatures and the like are poorer than in the examples.

Notes: *1) Measurement was made at 60° C. by the use of a digital varied-angle gloss meter UGV-4D made by Suga Tester Co., Ltd.

*2) Measurement was made by putting a drop of pure water on the surface of the coating film, and then determining a contact angle by a contact angle meter made by Kyowa Kagaku Co., Ltd. (the unit was degree).

*3) Evaluation was made by observing the surface state of the coating film when the latter was bent at 180° at a temperature of −20° C. via a round rod having a diameter of 50 mm.

*4) Evaluation was made by immersing each test piece in a 5% aqueous sulfuric acid solution at room temperature for one day, and then observing its appearance visually.

*5) Evaluation was made by immersing each test piece of Nisseki regular gasoline at room temperature for one day, and then observing its appearance visually.

*6) Evaluation was made immersing each test piece in warm water at 40° C. for the days, and then observing its appearance visually.

*7) The weathering resistance test was carried out for 1000 hours by the use of a QUV acceleration tester made by Q Panel Co., Ltd.

*8) Evaluation was made on the basis of erasing properties by marking the surface of the coating film with oily black ink, allowing it to stand at room temperature for 24 hours, and then wiping out the ink mark with a gauze containing n-butanol.

What is claimed is:

1. A method for forming a coating film which comprises the steps of coating a member with a coating material containing a pigment for a thermosetting base coat, overcoating the coated member with a coating material for a thermosetting clear coat in a wet-on-wet coating manner, and then thermosetting the uncured coating films simultaneously;

a binder component in said coating material for said base coat comprising
(1) 50 to 90% by weight of an acrylic copolymer (A) having a hydroxyl value of from 40 to 80 mg KOH/g and an acid value of from 0.5 to 30 mg KOH/g and a glass transition temperature of from −40° to 20° C. which is obtained by copolymerizing
  (a) 10 to 40% by weight of a hydroxyl group-containing (meth)acrylic ester,
  (b) 0.2 to 10% by weight of a carboxyl group-containing vinyl monomer,
  (c) 30 to 89.8% by weight of a (meth)acrylic ester represented by the general formula (I)

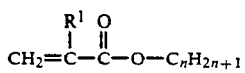
$$CH_2=\overset{R^1}{\underset{|}{C}}-\overset{O}{\underset{\|}{C}}-O-C_nH_{2n+1} \quad (I)$$

(wherein $R^1$ is a hydrogen atom or a methyl group, and n (d) 0 to 30% by weight of another copolymerizable vinyl monomer, and
(2) 10 to 50% by weight of a curing agent;

a binder component in the coating material for the clear coat comprising
(3) an acrylic copolymer (B) having a hydroxyl value of from 50 to 180 mg KOH/g, an acid value of from 2 to 40 mg KOH/g and a glass transition temperature of from −40° to 20° C. which is obtained by copolymerizing
  (e) 5 to 60% by weight of a (meth)acrylic ester containing a fluoroalkyl group or a perfluoroalkyl group,
  (f) 10 to 60% by weight of at least one hydroxyl group-containing (meth)acrylic ester represented by the general formula (II)

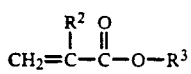
$$CH_2=\overset{R^2}{\underset{|}{C}}-\overset{O}{\underset{\|}{C}}-O-R^3 \quad (II)$$

(wherein $R^2$ is a hydrogen atom or a methyl group, $R^3$ is an organic substituent represented by the formula (III), (IV), (V) or (VI)

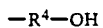
$$-R^4-OH \quad (III)$$

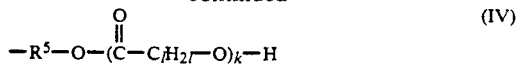
$$-R^5-O-(\overset{O}{\underset{\|}{C}}-C_lH_{2l}-O)_k-H \quad (IV)$$

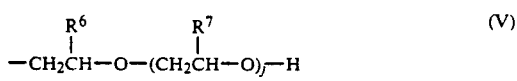
$$-CH_2\overset{R^6}{\underset{|}{CH}}-O-(CH_2\overset{R^7}{\underset{|}{CH}}-O)_j-H \quad (V)$$

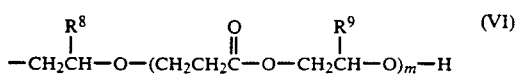
$$-CH_2\overset{R^8}{\underset{|}{CH}}-O-(CH_2CH_2\overset{O}{\underset{\|}{C}}-O-CH_2\overset{R^9}{\underset{|}{CH}}-O)_m-H \quad (VI)$$

wherein each of $R^4$ and $R^5$ is a straight-chain or branched alkylene group having 1 to 8 carbon atoms, each of $R^6$, $R^7$, $R^8$ and $R^9$ is a hydrogen atom or a methyl group, l is an integer of from 2 to 5, j is an integer of from 2 to 10, k is an integer of from 1 to 7, and m is an integer of from 1 to 3), (g) 0.2 to 10% by weight of a vinyl monomer containing at least one of a carboxylic group, a sulfonic group and a phosphoric acid group,
  (h) 15 to 70% by weight of a (meth)acrylic ester represented by the general formula (VII)

$$CH_2=\overset{R^{10}}{\underset{|}{C}}-\overset{O}{\underset{\|}{C}}-O-R^{11} \quad (VII)$$

(wherein $R^{10}$ is a hydrogen atom or a methyl group, $R^{11}$ is a hydrocarbon substituent having 4 or more carbon atoms) and
  (i) 5 to 50% by weight of another copolymerizable vinyl monomer, and
(4) a polyisocyanate compound (C);

a ratio X/Y of an equivalent (X) of the OH group present in said acrylic copolymer (B) to an equivalent (Y) of the NCO group in said polyisocyanate compound (C) being in the range of from 1/0.5 to 1/1.5.

2. A method for forming a coating film according to claim 1 wherein said binder component in said coating material for the base coat comprising
(1) 60 to 85% by weight of an acrylic copolymer (A) having a hydroxyl value of from 50 to 70 mg KOH/g and an acid value of from 3 to 20 mg KOH/g and a glass transition temperature of from −25° to 10° C. which is obtained by copolymerizing
  (a) 15 to 30% by weight of a hydroxyl group-containing (meth)acrylic ester,
  (b) 0.5 to 5% by weight of a carboxyl group-containing vinyl monomer,
  (c) 50 to 80% by weight of a (meth)acrylic ester represented by the general formula (I)

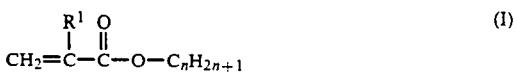
$$CH_2=\overset{R^1}{\underset{|}{C}}-\overset{O}{\underset{\|}{C}}-O-C_nH_{2n+1} \quad (I)$$

(wherein $R^1$ is a hydrogen atom or a methyl group, and n is an integer of from 1 to 6) and
  (d) 0 to 30% by weight of another copolymerizable vinyl monomer, and
(2) 15 to 40% by weight of a curing agent;

a binder component in the coating material for the clear coat comprising (3) an acrylic copolymer (B) having a hydroxyl value of from 80 to 160 mg KOH/g, an acid value of from 5 to 20 mg KOH/g and a glass transition temperature of from $-30°$ to $10°$ C. which is obtained by copolymerizing
  (e) 10 to 40% by weight of a (meth)acrylic ester containing a fluoroalkyl group or a perfluoroalkyl group,
  (f) 20 to 40% by weight of at least one hydroxyl group-containing (meth)acrylic ester represented by the general formula (II)

$$CH_2=\overset{R^2}{\underset{|}{C}}-\overset{O}{\underset{\|}{C}}-O-R^3 \qquad (II)$$

(wherein $R^2$ is a hydrogen atom or a methyl group, $R^3$ is an organic substituent represented by the formula (III), (IV), (V) or (VI)

$$-R^4-OH \qquad (III)$$

$$-R^5-O-(\overset{O}{\underset{\|}{C}}-C_lH_{2l}-O)_k-H \qquad (IV)$$

$$-CH_2\overset{R^6}{\underset{|}{C}}H-O-(CH_2\overset{R^7}{\underset{|}{C}}H-O)_j-H \qquad (V)$$

$$-CH_2\overset{R^8}{\underset{|}{C}}H-O-(CH_2CH_2\overset{O}{\underset{\|}{C}}-O-CH_2\overset{R^9}{\underset{|}{C}}H-O)_m-H \qquad (VI)$$

wherein each of $R^4$ and $R^5$ is a straight-chain or branched alkylene group having 1 to 8 carbon atoms, each of $R^6$, $R^7$, $R^8$ and $R^9$ is a hydrogen atom or a methyl group, l is an integer of from 2 to 5, j is an integer of from 2 to 10, k is an integer of from 1 to 7, and m is an integer of from 1 to 3),
  (g) 0.5 to 5% by weight of a vinyl monomer containing at least one of a carboxylic group, a sulfonic group and a phosphoric acid group,
  (h) 30 to 60% by weight of a (meth)acrylic ester represented by the formula (VII)

$$CH_2=\overset{R^{10}}{\underset{|}{C}}-\overset{O}{\underset{\|}{C}}-O-R^{11} \qquad (VII)$$

(wherein $R^{10}$ is a hydrogen atom or a methyl group, $R^{11}$ is a hydrocarbon substituent having 4 or more carbon atoms) and
  (i) 5 to 50% by weight of another copolymerizable vinyl monomer, and
(4) a polyisocyanate compound (C);
a ratio X/Y of an equivalent (X) of the OH group present in the acrylic copolymer (B) to an equivalent (Y) of the NCO group in the polyisocyanate compound (C) being in the range of from 1/0.8 to 1/1.2.

3. A method for forming a coating film according to claim 1 or 2 wherein said hydroxyl group-containing (meth)acrylic ester in said paragraph (1) (a) is a (meth)acrylic ester having a hydroxyalkyl group containing 2 to 4 carbon atoms.

4. A method for forming a coating film according to claim 1 or 2 wherein said carboxyl group-containing vinyl monomer in said paragraph (1) (b) is selected from the group consisting of acrylic acid, methacrylic acid, maleic acid, fumaric acid, itaconic acid, a monoalkyl ester of maleic acid, a monoalkyl ester of fumaric acid and a monoalkyl ester of itaconic acid.

5. A method for forming a coating film according to claim 1 or 2 wherein said (meth)acrylic ester represented by the general formula (I) in said paragraph (1) (c) is a methacrylic ester having an alkyl group containing 1 to 4 carbon atoms.

6. A method for forming a coating film according to claim 1 or 2 wherein said other copolymerizable vinyl monomer in said paragraph (1) (d) is selected from the group consisting of styrene derivatives, N-alkoxysubstituted (meth)acrylamides, (meth)acrylic esters each having an epoxy group on the side chain thereof and (meth)acrylic esters each having an amino group on the side chain thereof.

7. A method for forming a coating film according to claim 1 or 2 wherein said curing agent in the paragraph (2) is an amino resin or a polyisocyanate compound.

8. A method for forming a coating film according to claim 7 wherein said amino resin is a butyl-etherified melamine resin or a methyl-etherified melamine resin.

9. A method for forming a coating film according to claim 1 or 2 wherein said (meth)acrylic ester in said paragraph (3) (e) is a (meth)acrylic ester having a fluoroalkyl group or a perfluoroalkyl group having 3 to 22 carbon atoms on the side chain.

10. A method for forming a coating film according to claim 1 or 2 wherein said hydroxyl group-containing (meth)acrylic ester represented by the general formula (II) is a ring-opening adduct of an organic lactone with a (meth)acrylic ester having a hydroxyalkyl group containing 2 to 4 carbon atoms.

11. A method for forming a coating film according to claim 1 or 2 wherein said vinyl monomer in said paragraph (3) (g) is selected from the group consisting of acrylic acid, methacrylic acid, maleic acid, fumaric acid, itaconic acid, a monoalkyl ester of maleic acid, a monoalkyl ester of fumaric acid and a monoalkyl ester of itaconic acid.

12. A method for forming a coating film according to claim 1 or 2 wherein said (meth)acrylic ester represented by the general formula (VII) in said paragraph (3) (h) is a (meth)acrylic ester having a hydrocarbon substituent containing 4 to 18 carbon atoms.

13. A method for forming a coating film according to claim 1 or 2 wherein said other copolymerizable vinyl monomer in said paragraph (3) (i) is selected from the group consisting of styrene derivatives, N-alkoxysubstituted (meth)acrylamides, (meth)acrylic esters each having an epoxy group on the side chain thereof and (meth)acrylic esters each having a hydrocarbon substituent containing 1 to 3 carbon atoms.

14. A method for forming a coating film according to claim 1 or 2 wherein said polyisocyanate compound (C) in said paragraph (4) is a polyisocyanate compound derived from an aliphatic diisocyanate.

* * * * *